Feb. 12, 1929.
G. L. MATTHIAS
METHOD AND APPARATUS FOR PRODUCING CHANNEL RUBBER
Filed Nov. 19, 1926.
1,702,123
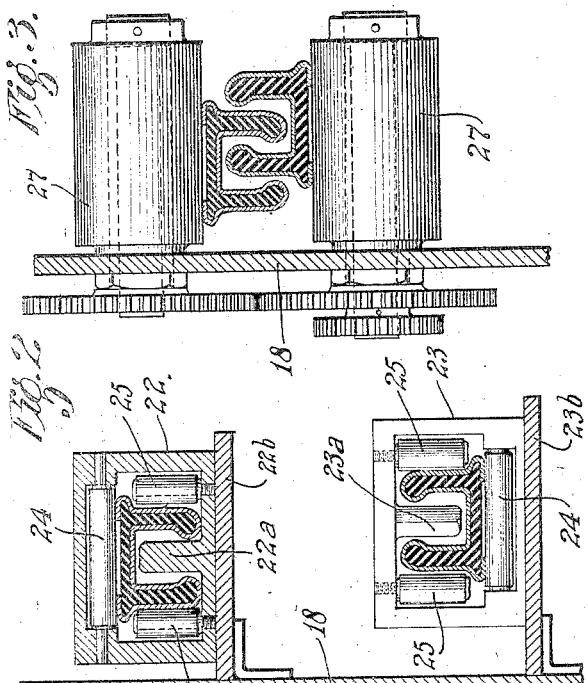
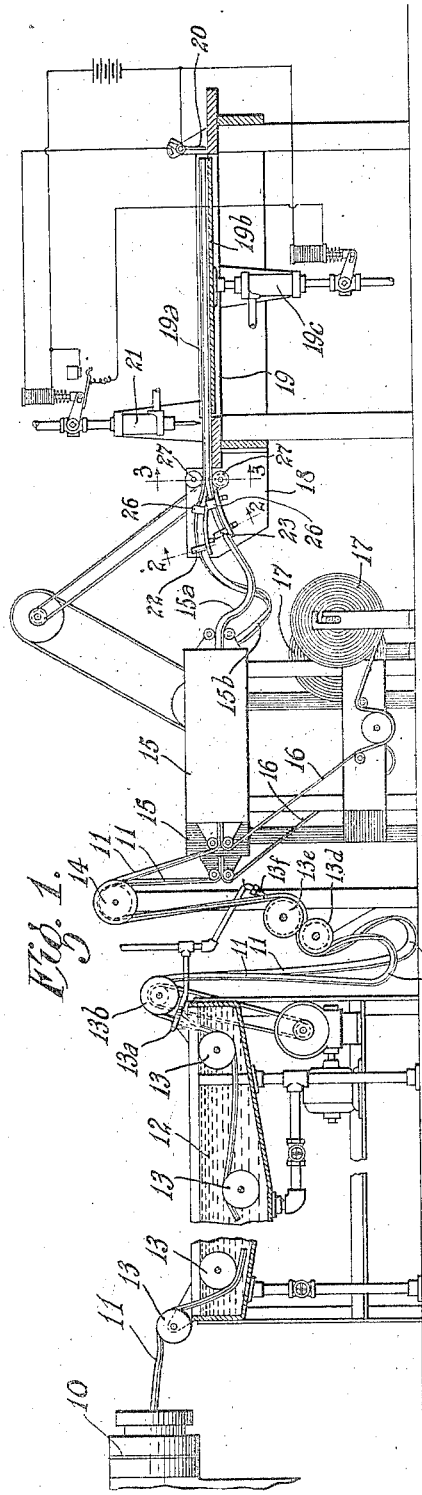
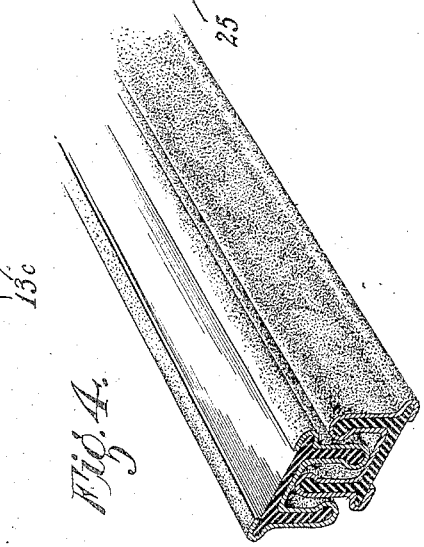
Inventor,
Gilbert L. Matthias
By Pierson, Eakin & Avery
Attys.

Patented Feb. 12, 1929.

1,702,123

UNITED STATES PATENT OFFICE.

GILBERT L. MATTHIAS, OF CUYAHOGA FALLS, OHIO, ASSIGNOR TO THE B. F. GOODRICH COMPANY, OF NEW YORK, N. Y., A CORPORATION OF NEW YORK.

METHOD AND APPARATUS FOR PRODUCING CHANNEL RUBBER.

Application filed November 19, 1926. Serial No. 149,505.

This invention relates to procedure and apparatus for producing channel rubber and especially channel rubber covered with felt or the like, such as the channel rubber employed in the window frames of automobiles to guide and prevent rattling of the window glass therein.

Heretofore such channel rubber commonly has been produced by extruding the rubber in a continuous strip of channel section from a tube machine, coiling the strip upon a vulcanizing pan, then vulcanizing the strip and thereafter cementing it and covering it with a cemented strip of fabric or felt, the strip of rubber being handled singly, both before and after the covering operation. Because of the soft, deformable character of the freshly extruded rubber care has been required in the coiling of the strip upon the vulcanizing pan to prevent successive turns of the strip from sticking together in the coiling operation and to prevent distortion of the strip and in this procedure a comparatively large amount of vulcanizer space has been required, and very substantial waste has occurred in cutting to length.

My chief objects are to reduce waste and to reduce the time, labor and vulcanizer capacity required for producing the final product. More specific objects are to avoid the necessity of coiling the unvulcanized strip rubber; to avoid the necessity of applying cement to the rubber before it is covered; to permit a large quantity of material to be compactly associated for vulcanization so as to reduce the amount of vulcanizer space required; to economize in time, labor and equipment and avoid waste in the matter of cutting the product into suitable lengths for use; and to provide for maintaining the channel strips in their desired form during vulcanization. Another object is to provide for applying the cover to the channel strip before vulcanization of the latter and thus to obtain an improved product in which the cover is vulcanized in place.

I attain these objects in my preferred procedure by extruding two strips of the channel rubber at adjacent positions; immediately cooling the strips to shrink them and reduce their plasticity, as by passing them through a water bath; feeding them through respective covering machines; so feeding them from the covering machines as to bring the two strips into association with each other with one leg of each strip extending into the channel of the other, so that the strips sustain each other as to their cross sectional form; measuring and cutting to length the two strips while they are thus associated; and then vulcanizing the cut lengths of associated strips in open heat.

Of the accompanying drawings:

Fig. 1 is a side elevation of apparatus embodying and adapted to carry out my invention in its preferred form.

Fig. 2 is a section on line 2—2 of Fig. 1.

Fig. 3 is a section on line 3—3 of Fig. 1.

Fig. 4 is a fragmentary, perspective view of two lengths of the covered channel rubber showing how they are associated with each other for the operations of cutting to length and vulcanizing.

Referring to the drawings, the apparatus comprises an extruding machine 10 having a die adapted to extrude, side by side, two strips 11, 11 of the channel rubber. The water bath is shown at 12, suitable guide rolls 13, 13 being provided to cause the extruded strips to pass through the bath. From the water bath the strips are each led through an air-blast ring 13$^a$ adapted to blow the water from all sides of the strip and then over a driven feed roll 13$^b$ into a reserve loop 13$^c$. A pair of guide rolls 13$^d$, 13$^e$ are so formed and mounted as to guide each strip out of the reserve loop in an inverted position so that any residual water in the channel of the strip may be spilled therefrom as the strip passes about the roller 13$^e$. From the rolls 13$^e$ the strips are led past air nozzles 13$^f$ adapted to blow residual water from the channels and over respective guide rolls such as the roll 14 to respective covering machines 15, 15, which may be of the type shown in Ambler and Rohrbacher United States Patent No. 1,555,816, or of other suitable construction, each of the said machines being adapted to apply to its rubber strip a covering strip 16 of fabric, felt or the like, the covering strips being drawn from stock rolls 17, 17. The covering strips are preferably cemented on the face which is to contact the rubber of the channel strip.

From the covering machines 15 the respective strips 11 pass into reserve loops 15$^a$, 15$^b$, from which they are drawn by a pair or driven feed rolls 27, 27 through a set of guiding devices mounted upon a vertical plate 18 and adapted to guide the two strips into the above described association with each other, the said plate 18 projecting from the end of a table 19 which is provided with an electric contact lever 20 adapted for the measuring off of lengths to be cut from the continuous associated strips, the table also having mounted thereon between the plate 18 and the contact lever 20 a pneumatic guillotine cutter 21 having electric connection to the lever 20 and adapted to be actuated thereby for the severance of the strips.

The guiding devices mounted upon the plate 18 comprise an upper guiding device 22 adapted to invert the strip which is drawn therethrough so that the base of the strip is uppermost, and a lower guiding device 23 adapted to maintain the other strip with its base downward as the strip is drawn therethrough. Each of these guiding devices comprises an apertured frame formed with a tongue, 22ª or 23ª adapted to be straddled by the legs of the covered channel strip and in each frame is mounted a roller 24 adapted to run upon the base of the strip and a pair of rollers 25, 25 adapted to run upon the outer faces of the respective legs of the strip, the rollers being adapted to prevent binding and chafing of the strip as the latter is forced into its proper position by being drawn through the device.

A second pair of guides 26, 26, Fig. 1, are supported by the plate 18 in position to bring the strips closer toward and into alignment with each other for the above described association. The guides 26 may be of simple, strip-enclosing form, as they are required only to direct the strips toward each other after the devices 22 and 23 have forced them into approximately their desired relative positions. The guiding device 22 or 23 and the guide 26 for each strip preferably are mounted upon a common plate-like-bracket, 22ᵇ or 23ᵇ, adapted to provide a continuous support for the strip between the two guides.

The table 19 is formed with a guide slot 19ª adapted to receive the associated strips and maintain them in straight form so that they will actuate the contact lever 20, and an ejector 19ᵇ constitutes a floor for the strip-receiving slot 19ª and is mounted upon the piston rod of a fluid-pressure cylinder 19ᶜ having electric connection with the contact lever 20 such that the ejector is elevated immediately after the actuation of the cutter and then immediately lowered.

In the operation of the apparatus, the rubber strips being continuously extruded from the machine 10 and the said rubber strips and the covering strips 16 being threaded through the apparatus as shown, and the several forming and feeding devices being continuously driven, the two channel strips are continuously formed and covered and the guide rolls 27 feed them forward until their leading ends abut the contact lever 20, which actuates the cutter 21 to sever appropriate lengths from the strips. As each length is severed it is immediately lifted from the slot 19ª by the elevator 19ᵇ and is quickly removed by an operator for packing with others in a vulcanizing pan, the elevator immediately descending for the reception of the next length.

As the rubber is covered by the felt or like material of the covering strips 16 the said lengths may be stacked in the vulcanizer pans in contact with each other and to any suitable depth. The pans of severed lengths are then vulcanized in dry heat, the covering material preventing adhesion of the strips with each other and also contributing to the preservation of the cross-sectional form of the strips during vulcanization. The interfitting of the strips with each other as above described and as shown clearly in Fig. 4 avoids deformation of the strips during vulcanization and permits compact arrangement of the strips with consequent economy of vulcanizer space. The strips being formed as continuous strips and cut to length before vulcanization, expensive waste of vulcanized stock such as has occurred in prior practice is avoided.

The strips being still somewhat warm as they pass to the covering machines their residual heat assists in freeing them from moisture and also provides a tacky condition for the reception of the cover.

Modifications of my invention are possible within its scope as defined by the appended claims.

I claim:

1. The method of producing covered channel rubber which comprises progressively and concurrently forming two channeled rubber strips, progressively cooling the two strips as they are formed, progressively applying respective covering strips to the two rubber strips as they are cooled, feeding the two covered strips progressively, as they are covered, into association with each other with a leg of each strip extending into the channel of the other, concurrently severing successive pairs of associated lengths from the associated strips as they are fed into such association with each other, and vulcanizing the said lengths while they remain in the defined association with each other.

2. The method of producing channel rubber which comprises forming two channeled rubber strips, associating them with each other with a leg of each strip extending into the channel of the other, and vulcanizing the strips while they remain so associated.

3. A method as defined in claim 2 in which a covering strip is applied to each of the rubber strips before they are associated with each other.

4. The method of producing channel rubber which comprises forming two channeled rubber strips, associating them with each other with a leg of each strip extending into the channel of the other, and cutting lengths from the said strips while they are in such association.

5. Apparatus for producing channel rubber, the said apparatus comprising means for concurrently forming two channeled rubber strips, means for progressively cooling the two strips as they are formed, means for progressively applying respective covering strips to the two rubber strips as they are cooled, means for guiding the two covered strips, as they are drawn from the covering means, into association with each other with a leg of each strip extending into the channel of the other, and means for measuring and cutting to length the associated strips.

6. Apparatus for producing channel rubber, the said apparatus comprising means for concurrently forming two channeled rubber strips, means for progressively cooling the two strips as they are formed, means for progressively applying respective covering strips to the two rubber strips as they are cooled, and means for guiding the two covered strips into association with each other as they are drawn from the covering means.

7. Apparatus for producing channel rubber, the said apparatus comprising means for concurrently forming two channeled rubber strips, and means for guiding the two strips, as they are drawn from the forming means, into association with each other with a leg of each strip extending into the channel of the other strip.

8. Apparatus for producing channel rubber, the said apparatus comprising means for concurrently applying respective covering strips to two channeled rubber strips and means for guiding the two covered strips, as they are drawn from the covering means, into association with each other with a leg of each strip extending into the channel of the other strip.

In witness whereof I have hereunto set my hand this 20th day of October, 1926.

GILBERT L. MATTHIAS.